Sept. 16, 1958 T. J. KEARNEY 2,852,417
CLEANING METHOD AND APPARATUS
Filed June 17, 1954 9 Sheets-Sheet 1
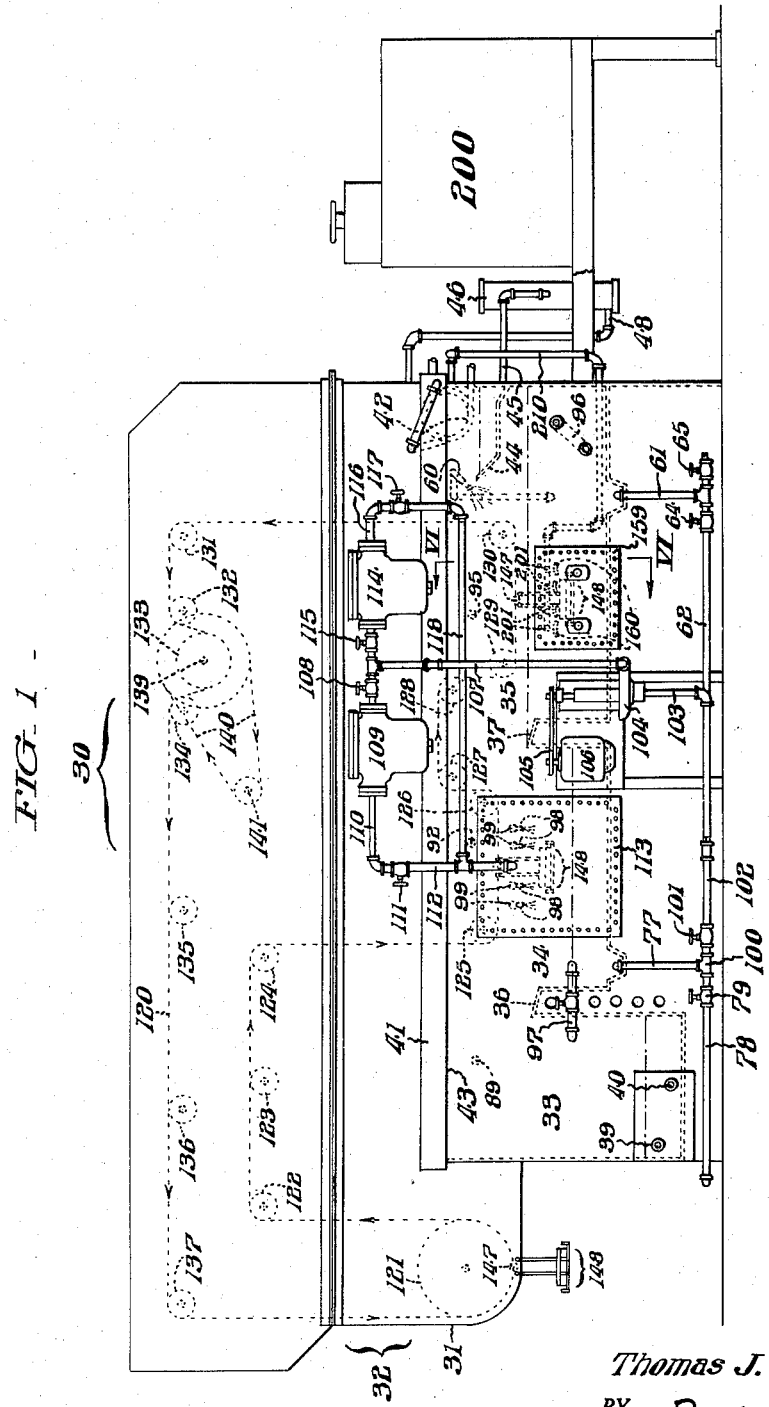
INVENTOR.
Thomas J. Kearney,
BY Paul & Paul
ATTORNEYS.

Sept. 16, 1958
T. J. KEARNEY
2,852,417
CLEANING METHOD AND APPARATUS
Filed June 17, 1954
9 Sheets-Sheet 2
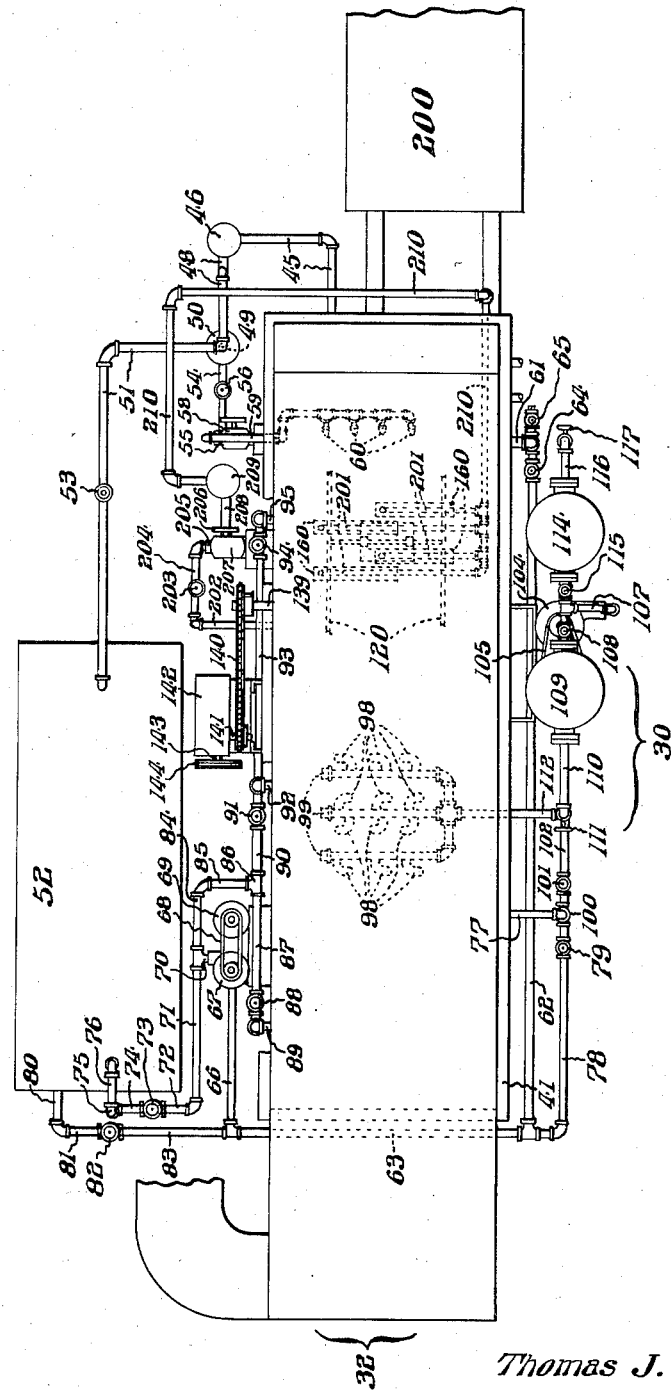
FIG_2_
INVENTOR.
Thomas J. Kearney,
BY Paul & Paul
ATTORNEYS.

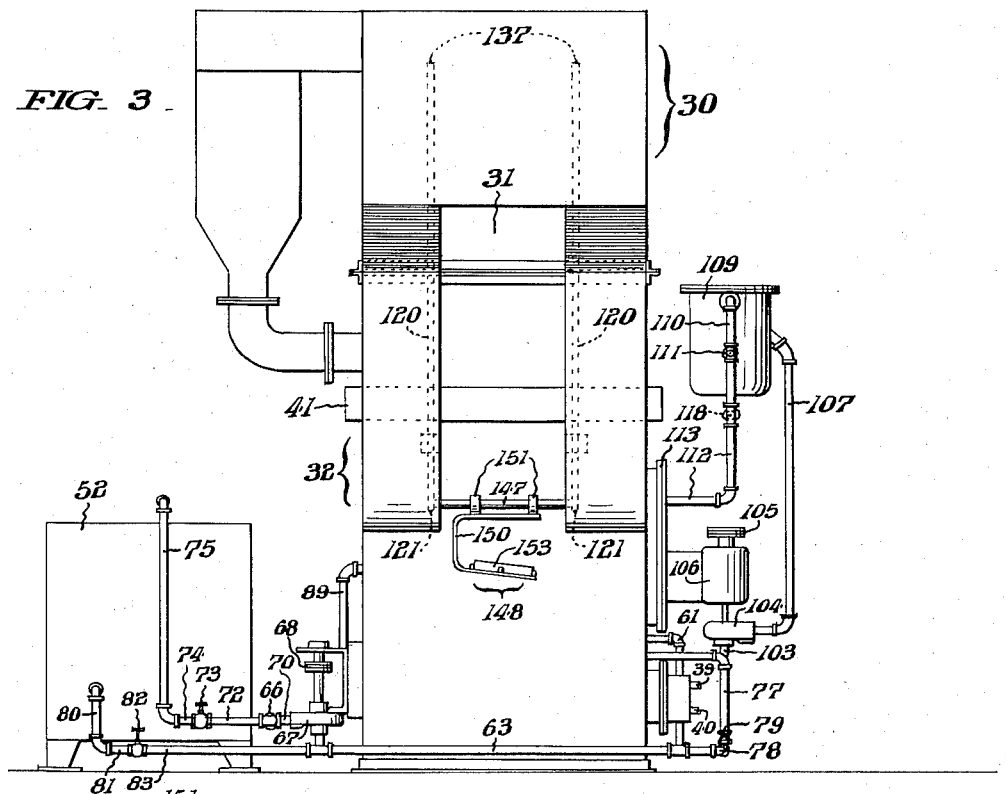
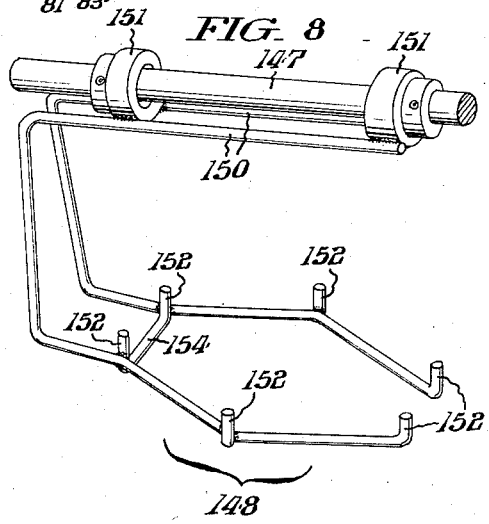
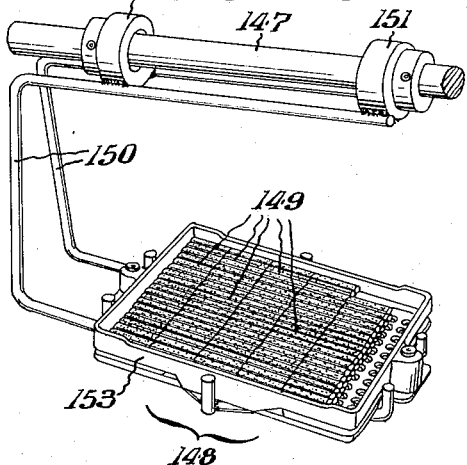

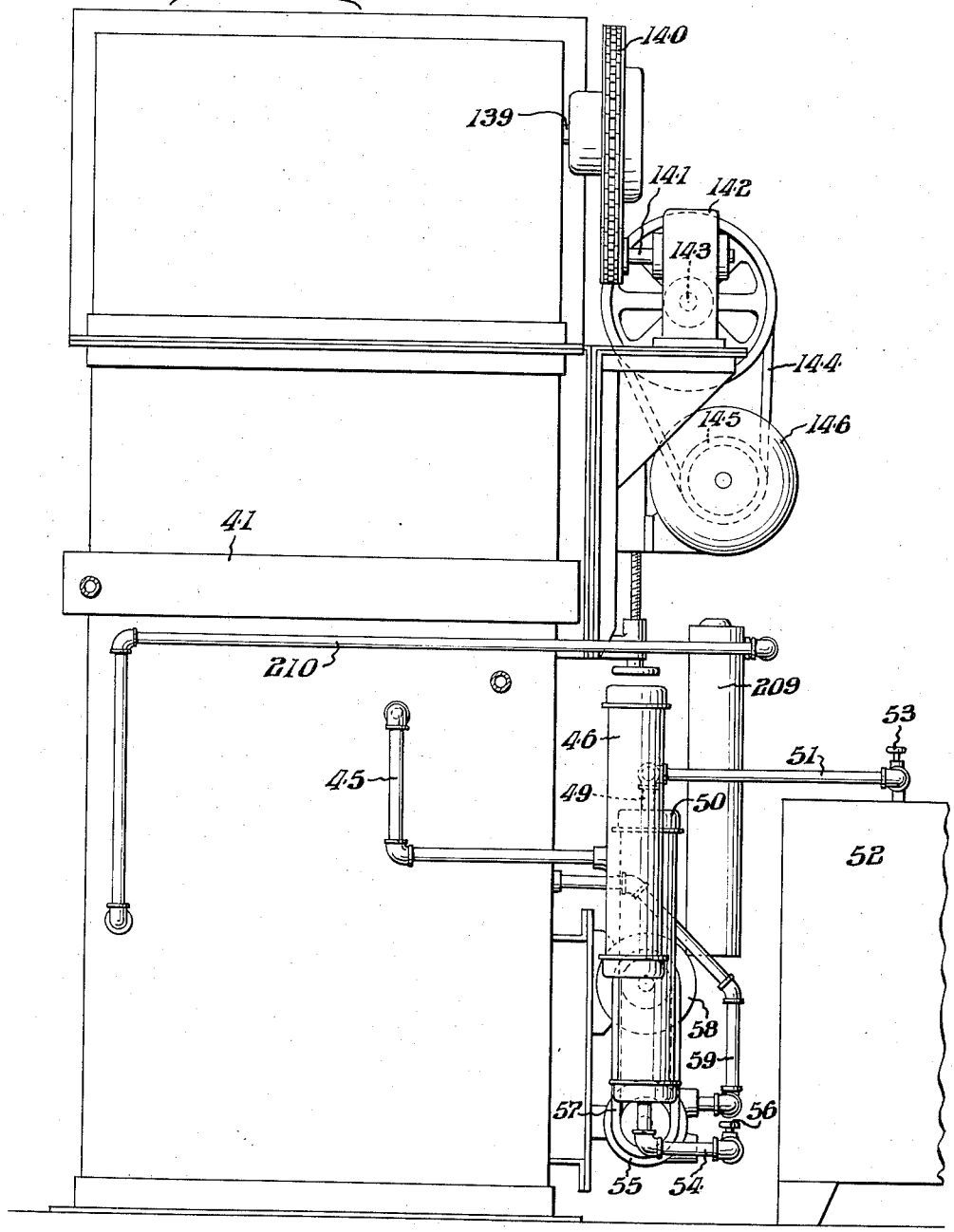

Sept. 16, 1958   T. J. KEARNEY   2,852,417
CLEANING METHOD AND APPARATUS
Filed June 17, 1954   9 Sheets-Sheet 5
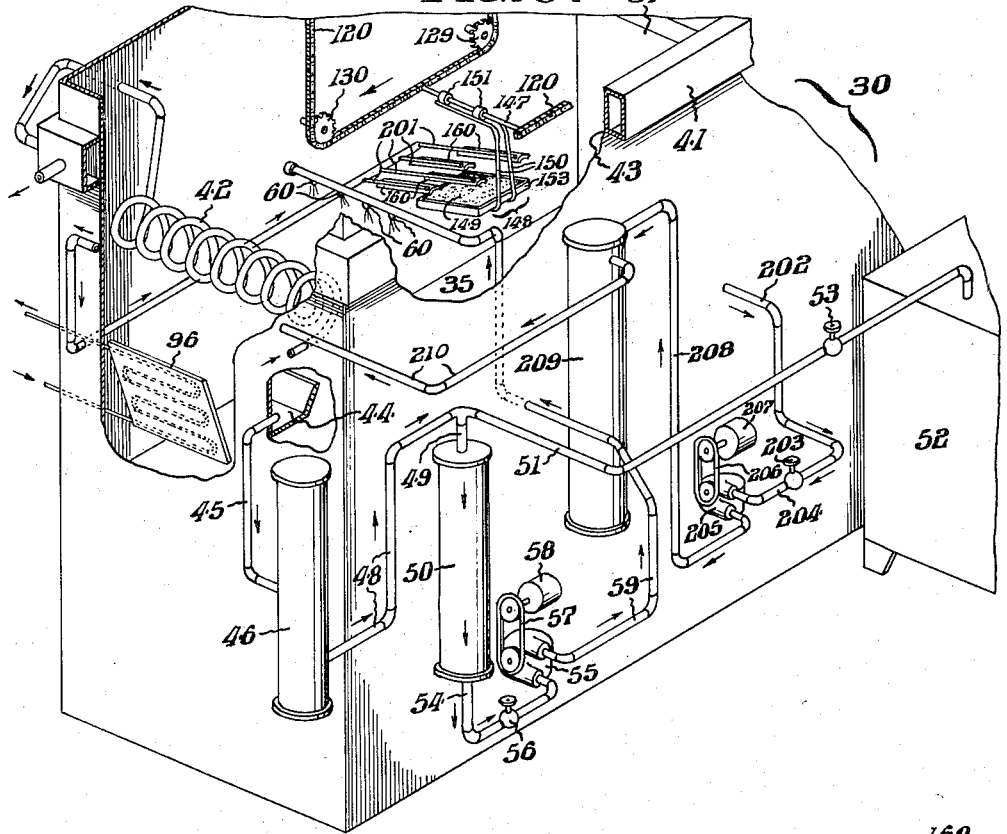
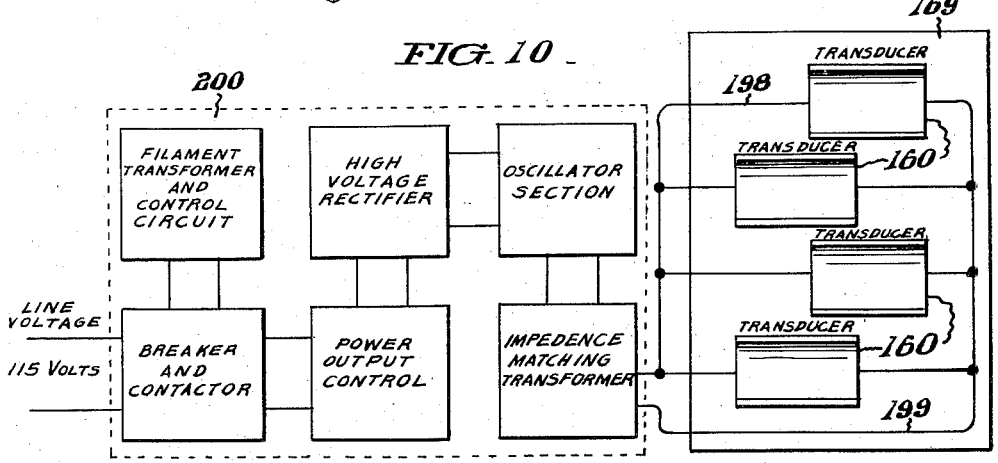
INVENTOR.
Thomas J. Kearney,
BY Paul & Paul
ATTORNEYS.

Sept. 16, 1958 T. J. KEARNEY 2,852,417
CLEANING METHOD AND APPARATUS
Filed June 17, 1954 9 Sheets-Sheet 6
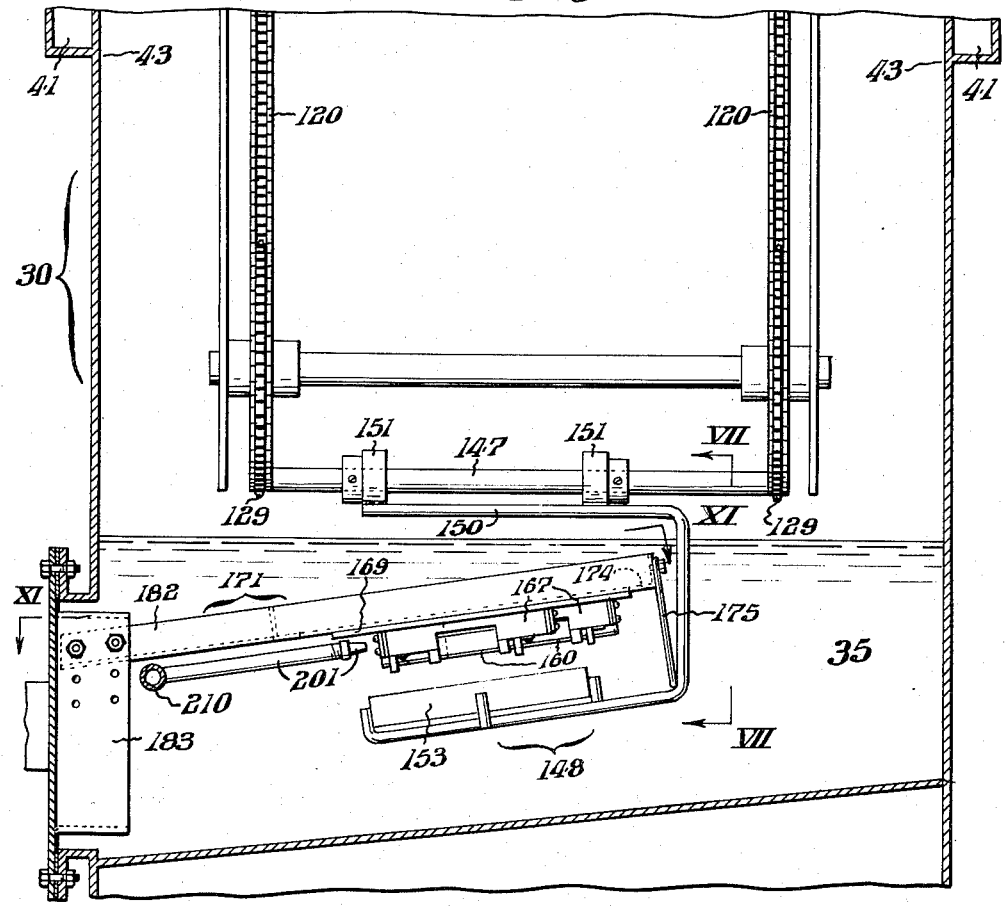
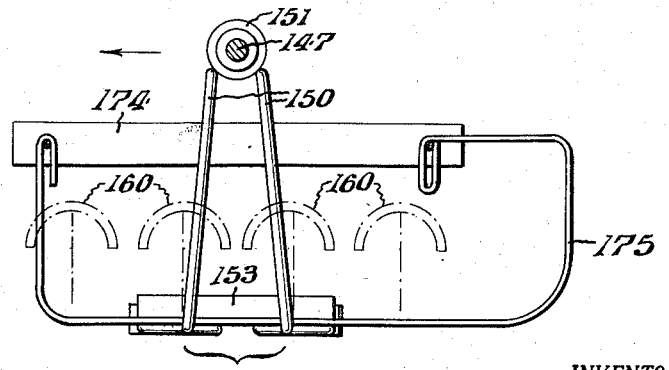
INVENTOR.
Thomas J. Kearney,
BY Paul & Paul
ATTORNEYS.

Sept. 16, 1958 T. J. KEARNEY 2,852,417
CLEANING METHOD AND APPARATUS
Filed June 17, 1954 9 Sheets-Sheet 7
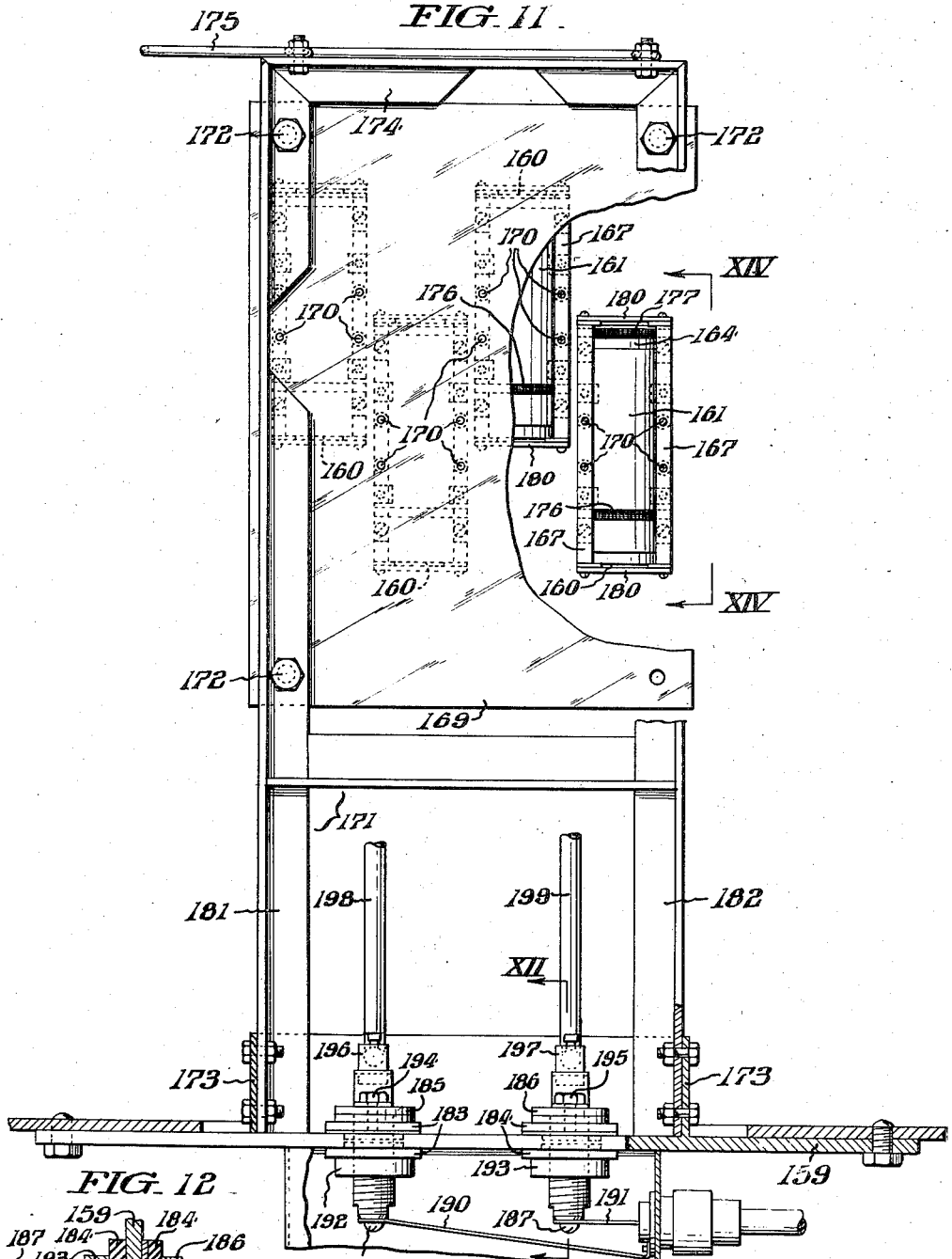
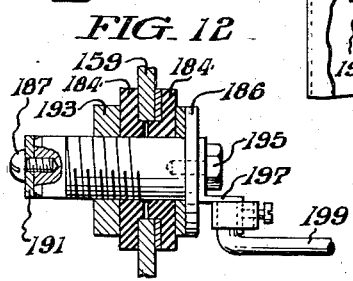
INVENTOR.
Thomas J. Kearney,
BY Paul & Paul
ATTORNEYS.

Sept. 16, 1958     T. J. KEARNEY     2,852,417
CLEANING METHOD AND APPARATUS
Filed June 17, 1954     9 Sheets-Sheet 8
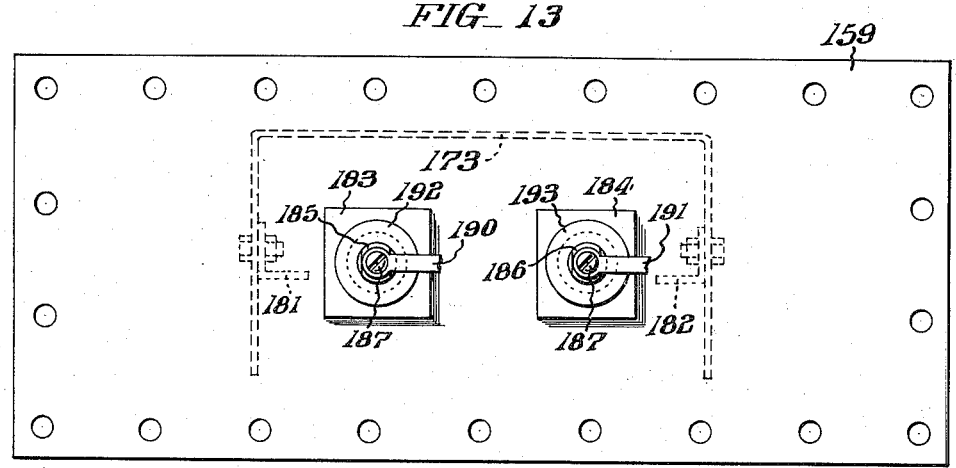
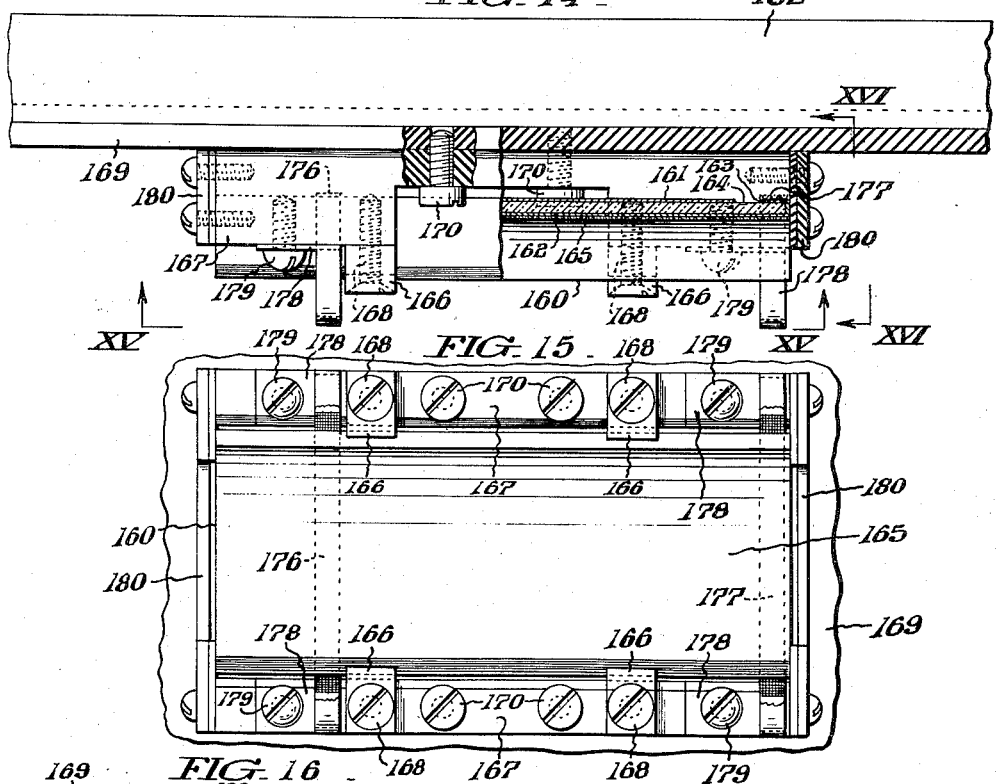
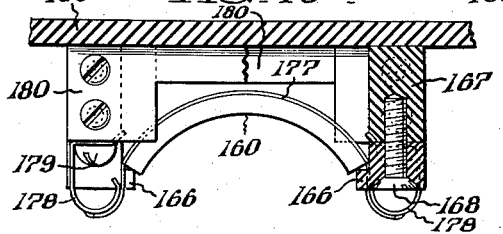
INVENTOR.
Thomas J. Kearney,
BY Paul & Paul
ATTORNEYS.

Sept. 16, 1958     T. J. KEARNEY     2,852,417
CLEANING METHOD AND APPARATUS
Filed June 17, 1954                                                 9 Sheets-Sheet 9
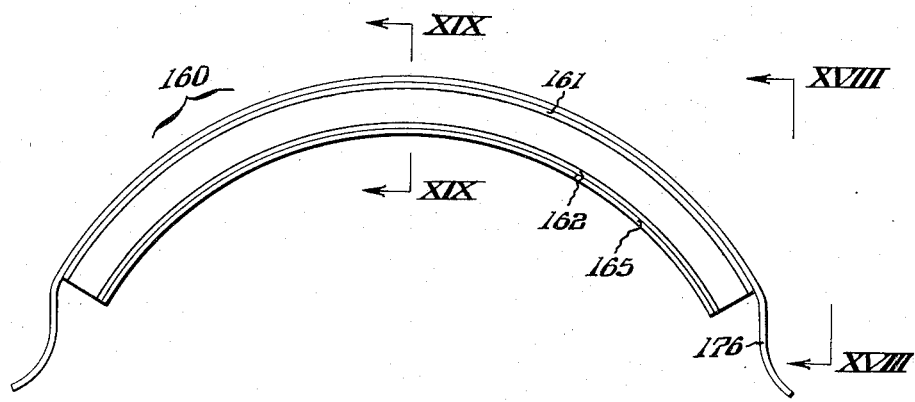
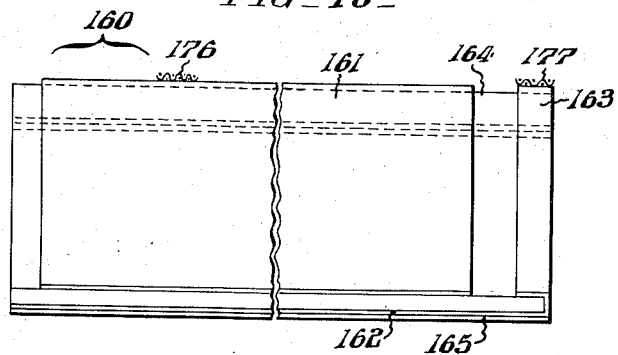
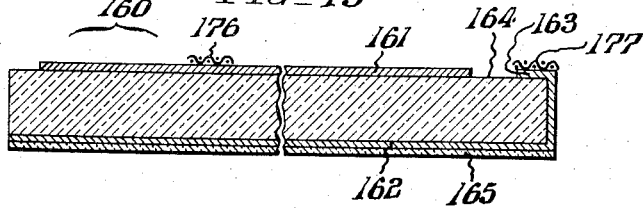
INVENTOR.
Thomas J. Kearney,
BY Paul & Paul
ATTORNEYS.

United States Patent Office 2,852,417
Patented Sept. 16, 1958

2,852,417

CLEANING METHOD AND APPARATUS

Thomas J. Kearney, Detroit, Mich., assignor to Detrex Corporation, Detroit, Mich., a corporation of Michigan Application June 17, 1954, Serial No. 437,437

16 Claims. (Cl. 134—1)

This invention relates to the cleaning of a work object. More specifically, it is concerned with dissolving grease and removing clinging dirt or "soil" from intricately formed metal machine parts by treatment with chlorinated hydrocarbons. Finely machined parts which have been buffed, lapped or ground, as for example, heads for electric razors, hypodermic needles, deep drilled metal parts and the like, are very difficult to clean and previous methods and apparatus as ordinarily constructed did not accomplish the complete removal of grease and adhering dirt or "soil" from the hollows or interstices of intricately machined parts.

The primary object of my invention is to clean and degrease thoroughly such parts. This objective is attained, as hereinafter more fully disclosed, through provision of an improved apparatus in which the parts to be cleaned are not only contacted with a solvent vapor, sprayed with a solvent and immersed in a solvent, but additionally subjected to ultrasonic vibrations beamed directly down upon the precision machine parts to be cleaned while the parts are submerged in a solvent bath.

The resulting cleanliness of the work object has heretofore been unobtainable, inspections indicating that no trace of dirt or solid matter remain on the surface of the work object.

Further features and objects of the invention, as well as the details of a typical and preferred embodiment thereof, will be understood from the detailed description to follow, throughout which reference is made to the accompanying drawings.

Fig. 1 represents a side elevation of a cleaning and degreasing apparatus constructed in accordance with my invention and suitable for the practice of my improved cleaning method.

Fig. 2 represents a top plan of the apparatus of Fig. 1.

Figs. 3 and 4 represent end views showing the opposite ends of the apparatus of Fig. 1.

Fig. 5 represents a fragmentary view showing a portion of the apparatus of Fig. 1 schematically.

Fig. 6 represents a cross-sectional view of a part of the apparatus of Fig. 1 with one of the work carriers positioned beneath the transducers, as indicated by the lines and arrows VI—VI which appear in Fig. 1.

Fig. 7 represents an enlarged view taken as indicated by the lines and arrows VI—VI which appear in Fig. 6.

Fig. 8 is a prospective view of the work carrier shown in Fig. 6.

Fig. 9 is a perspective view of the work carrier shown in Fig. 8, the carrier being loaded with work objects to be cleaned.

Fig. 10 represents a wiring diagram of the oscillator unit by which ultrasonic vibrations are induced in the transducer.

Fig. 11 is a detailed fragmentary view taken as indicated by the lines and arrows XI—XI which appear in Fig. 6.

Fig. 12 represents a detailed sectional view of the connector in the door of the housing taken as indicated by the lines and arrows XII—XII which appear in Fig. 11.

Fig. 13 represents an enlarged view in elevation of the door to the ultrasonic bath well.

Fig. 14 is a fragmentary side view in elevation of a transducer and the unit by which it is supported in the apparatus taken as indicated by the lines and arrows XIV—XIV in Fig. 11.

Fig. 15 is a bottom plan view of a transducer and the unit by which it is supported in the apparatus taken as indicated by the lines and arrows XV—XV of Fig. 14.

Fig. 16 is an end elevation view partly in section of a transducer and the unit by which it is supported in the apparatus taken as indicated by the lines and arrows XVI—XVI of Fig. 14.

Fig. 17 represents an end view of the transducer on an enlarged scale.

Fig. 18 is a side view of the transducer taken as indicated by the lines and arrows XVIII—XVIII of Fig. 17.

Fig. 19 is a sectional view of the transducer taken as indicated by the lines and arrows XIX—XIX of Fig. 17.

According to the specific form of the invention, selected for illustration, referring more specifically to Figs. 1–4, the apparatus comprises a horizontally, elongate housing 30 which, in practice, is constructed with walls of sheet metal. Except for an opening 31 at the bottom of an offset hood 32 at the loading end, the housing 30 is completely closed. The housing 30 contains a solvent used in the process in liquid or vapor form, and except for the loading aperture 31 is closed to exclude air and to prevent the escape of any solvent vapor that may be present. Serially arranged within the housing 30 are three wells 33, 34 and 35 with a dam 36 separating wells 33 and 34, and a dam 37 separating wells 34 and 35. Well 33 contains a solvent which is continuously boiled during operation of the apparatus by the action of a submerged steam or electrically heated coil of which the inlet and outlet ends are indicated by the numerals 39 and 40 respectively. Surrounding the housing 30 about midway of its height is a jacket 41 through which a coolant, preferably water, is continually circulated. A condenser coil 42 and jacket 41 keep the walls of the housing 30 cool, thus eliminating possible convection currents which would increase solvent consumption, and maintain a vapor level 43 of the solvent at the bottom of the jacket 41 above the wells 33, 34 and 35. Vapor condensed by the condenser coil 42 is collected in a condensate pan 44 positioned directly below coil 42 and is carried by piping 45 through a water separator 46 which may be of the conventional gravity type. The separator 46 is provided with a water outlet (not shown) which is piped to drain, a vent connection (not shown) and a solvent outlet pipe 48. The solvent outlet pipe 48 of water separator 46 is connected by pipe 49 to a condensate receiver 50 (Fig. 5) and by pipe 51 to a storage tank 52, flow through pipe 51 being controllable by a valve 53. An outlet pipe 54 leads from condensate receiver 50 to a centrifugal pump 55. A valve 56 is interposed in pipe 54 to control the flow therein. Pump 55 is driven through a belt pulley 57 by a motor 58 and the solvent is discharged from pump 55 through a pipe 59 to a series of spray nozzles 60 positioned to distribute the condensate over the work object as it emerges from the ultrasonic well 35.

Located in the lower part of well 35 is a suction pipe 61, and a pipe line 62, 63, with valves 64 and 65 interposed therein, leading to an intake pipe 66 of pump 67 which is driven by a belt pulley 68 from an electric motor 69. An output pipe 70 of pump 67 is connected by pipes 71, 72, a valve 73, and pipes 74, 75 and 76 to the storage tank 52. From the lower part of well 34 extends a pipe line 77, with a branch 78 and 63 with a valve 79 therein, connecting to pump intake pipe 66, pump 67, output pipe 70, pipes 71, 72 valve 73, and pipes 74, 75 and 76 to storage tank 52. This piping from the wells 35 and 36 to the storage tank 52 permits emptying of said wells.

From the lower part of storage tank 52 extends pipe line including a pipe 80, 81, a valve 82, a pipe 83, the intake pipe 66, pump 67; output pipe 70, a pipe 84, 85 and a juncture point 86 from which extends a branch pipe line to each of the three wells 33, 34 and 35. The branch line from juncture 86 to well 33 includes a pipe 87, a valve 88 and a pipe 89; that to well 34 includes a pipe 90, a valve 91 and a pipe 92; and that to well 35 includes a pipe 93, a valve 94 and a pipe 95. This system of piping from storage tank 52 to the wells permits filling or replenishing the liquid in the wells.

Well 35 is provided at the bottom with a plate or pipe coil 96 through which either water or steam is circulated as may be required to maintain the solvent at the desire temperature. Dam 37 permits solvent to overflow from well 35 to well 34, and an overflow pipe 97 permits the solvent of well 34 to overflow into well 33. The solvent in well 33 is continuously boiled to form a vapor which is maintained at level 43. This vapor is condensed by coil 42, collected in condensate pan 44, and returned to well 35 through the series of spray nozzles 60, thus completing the cycle of the solvent in the housing 30.

The well 34 is provided with a series of spray nozzles 98 which are mounted on spray headers 99 and positioned above the level of passage of the work object. Solvent is fed to these spray nozzles 98 from the well 34 through pipe 77, a T connection 100, a valve 101, a horizontal pipe 102, a vertical pipe 103, a centrifugal pump 104 driven through a belt pulley 105 by an electric motor 106, a vertical pipe 107, a valve 108, a strainer 109, a pipe 110, a valve 111, a pipe 112, through a cleanout door 113 in the side of well 34, to the manifolded spray headers 99. An alternate strainer 114 is provided to allow the cleaning of one strainer without interruption of the spray cycle. The alternate route for feeding solvent to spray nozzles 98 through the strainer 114 is from the pipe 107 to a valve 115, the strainer 114, a pipe 116, a valve 117, and a pipe 118 to pipe 112.

Arranged for travel in a circuitous course within housing 30 is an endless double chain conveyor 120, the path of which is prescribed by a system of sprocket wheels 121–137, the direction of travel being indicated by arrow heads in Fig. 1. As shown, the shaft 139 of the sprocket wheel 133 is coordinated by a sprocket chain connection 140 with the output shaft 141 of a speed reducer 142, and the input shaft 143 of the latter is connected, in turn, by a belt 144 to a variable speed pulley 145 on the shaft of an electric drive motor 146 at the rear of housing 30. The mechanism for adjusting the variable speed pulley 145 may be of any approved commercial type.

Hung from cross rods 147 between the chains of the conveyor 120 at uniformly spaced intervals are carriers 148 for work objects to be cleaned herein exemplified as electric razor heads 149. Each carrier 148 comprises two rods 150 attached to movable collars 151 on cross rod 147. The rods 150 are formed so as to be approximately horizontal and parallel to cross rod 147, then bent downwardly and diverging from each other, and then bent to something less than a horizontal and spread with upstanding projections 152 extending therefrom to form a seat for tray 153 in which are placed the work objects 149. Cross bar 154 is welded between the rods 150 to give strength and rigidity to the carrier.

By automatically operative means (not shown), the motor 146 is operated so that one of the carriers 148 is positioned above or within each of the wells 33, 34 and 35 for a definite time period. Motor 146 is operated continuously to cause the carriers to pass at a set rate of speed through the wells or is operated intermittently to cause the carriers to stop momentarily within or above the wells. After traversing the housing 30, the trays 153 containing the cleaned razor heads 149 are lifted from the carriers 148 as the carriers emerge at the bottom of offset hood 31 of the housing and freshly loaded trays with unclean razor heads are placed thereon.

Disposed in the well 35 below the solvent level therein is a means for inducing vibrations of ultrasonic frequency to insure complete cleaning of the work object while submerged in the solvent. As herein exemplified, this vibration inducing means comprises four elongate, arcuate in cross-section, transducers 160 connected electrically in a parallel circuit. In accordance with my invention, these transducers 160 are molded or otherwise fashioned from ceramic material such as barium titanate or the like having piezoelectric properties and are provided with silver coatings to form the electrodes 161 and 162 disposed on the convex and concave surfaces of the transducer 160.

The transducer 160 is silvered in such a way that the electrode 162 on the concave surface extends around one end of the transducer and for a short distance 163 on the convex side. Electrode 161 is separated from electrode 162 by an area 164 which is unsilvered. This arrangement permits making electrical contact with both electrodes 161 and 162 from the convex side of transducer 160. The transducers 160 are provided with a coating of phenolic or ceramic glaze 165 to prevent deterioration thereof due to cavitation of the solvent on the concave surface thereof. The transducers are non-rigidly supported transversely of the well 35 by inwardly facing shoulders 166 of an insulating material. These shoulders 166 are fastened to a pair of elongate insulating blocks 167 by screws 168. The insulating blocks 167 are in turn mounted on the underside of a base plate 169 by screws 170, base plate 169 being fastened by screws 172 to a rectangular supporting frame 171 made up of angles. The supporting frame 171 is bolted to a flange 173 protruding from the inside of a cleanout door 159. One end 174 of supporting frame 171 has bolted to it a rod 175 formed to provide a guide for the carrier 148 to guard against the carrier 148 swinging about the cross rod 147 and conceivably striking a transducer, and to insure passage of the tray 153 in a substantially horizontal position beneath the transducers. Contacting the electrodes 161 and 163 on the convex surface of the transducers are flexible woven straps 176 and 177. The ends of the straps 176 and 177 make a physical and electrical connection with connector clips 178 which are fastened to the blocks 167 by means of screws 179. The transducers 160 are restrained against endwise displacement by stop strips 180 of insulation which bridge the ends of each pair of blocks 167. Extending through laterally spaced holes in cleanout door 159 in the interval between the angles 181 and 182 of the frame 171, with interposition of insulation washers 183 and 184, are headed bolts 185 and 186; and secured by screws 187 to the outer ends of bolts 185 and 186 extending through cleanout door 159 are strap conductors 190 and 191 which connect to a source of electric current at ultrasonic frequency. Clamp nuts 192 and 193 secure the ensemblage tightly to the door 159 and prevent solvent leakage. Headed bolts 194 and 195 fasten connectors 196 and 197 to the inner ends of bolts 185 and 186 respectively and have extending therefrom a pair of flexible hose conductors 198 and 199 which make connection with connector clips 178 by any well known means.

Electric current at ultrasonic frequency flows from an electrically operated oscillator unit 200 through a circuit including strap conductor 190, bolt 185, connector 196, conductor 198 and associated connector clip 178, flexible strap 176, electrode 161, electrode 162, flexible strap 177 and associated connector clip 178, conductor 199, connector 197, bolt 186 and strap conductor 191 to return to the oscillator unit 200.

The well 35 is provided with a series of spray nozzles 201 positioned beneath the surface of the liquid in the well above the transducers. Each spray nozzle 201 is pointed toward the upper convex surface of an associated transducer and operates to continually flush the upper surface of the transducer. It has been found that fine metallic particles which are so small and light that they will not settle to the bottom of well 35 often deposit themselves on the upper surface of the transducer, especially when the liquid is being pumped out of the well. Inasmuch as the electrical connections are made on this upper surface of the transducer, this surface is constantly flushed to eliminate any possibility of these metal particles causing an electrical short circuit. Liquid is supplied to the nozzles 201 from well 35, and is filtered externally of that well, through a pipe 202, a valve 203, a pipe 204, a centrifugal pump 205 driven through a belt pulley 206 by an electric motor 207, a pipe 208, a filter 209 which is preferably a 10 micron cartridge type filter, a pipe 210 which passes into housing 30 and connects with the nozzles 201.

According to the present invention, the work to be cleaned is subjected to the action of a chlorinated hydrocarbon solvent, preferably trichlorethylene which has a boiling point of 188° F. The work object is first subjected to a vapor of the solvent arising from the first well where the solvent is continuously boiled. Next, the work object is taken to the second well where it is subjected to a forceful spray of the solvent at a temperature below boiling. Then the work object is carried through the vapor of the solvent to the third well where it is immersed in a liquid solvent at a temperature below that of the spray in the second well. The work object and the solvent of the third well are subjected to ultrasonic vibrations which operate to remove the grease, oil and soil remaining on the work object to leave said object in a highly clean condition. The barium titanate transducers are submerged in the liquid solvent in the third well and the liquid is maintained at a temperature below the Curie or transition temperature of the material of which the transducers are made.

It has been found that contacting the work object with the vapor of the solvent arising from the first well raises the temperature of the work object and accomplishes an initial removal of soil. Subjecting the work object to the forceful spray in the second well lowers the temperature of the work object and removes some additional soil. Leaving the work object beneath the transducers in the ultrasonic bath of the third well where radially dispersed standing waves of sound energy are bombarded upon the work object for a definite time interval insures penetration of the ultrasonic waves into the interstices of the work object and also penetration into the soil itself.

Some of the soil and grease may still be loosely attached to the work object upon removal from the third well, so to remove such soil, the work object is again sprayed with the liquid solvent of pure distillate, the impinging of the spray on the work object serving to jar loose the soil. The work object is then passed through a final vapor rinse.

As a final step, the work object is carried through a heating zone where any film of the solvent is removed by evaporation and from which the work emerges clean and dry.

The solvent in all stages of the process is maintained at a high degree of cleanliness by a process of continuous distillation and filtering. Solvent in the first well is boiled to give off vapors which are condensed above the third well, the condensate is subsequently filtered and returned through spray nozzles to the third well, which overflows into the second well and then overflows into the first well to be again boiled to form vapor. In the second well, solvent is continuously being withdrawn, strained and returned to the well through spray nozzles. And in the third well, solvent is continuously being withdrawn, filtered and returned to the well to flush the transducers.

For a better understanding of the process of this invention reference may be had to the accompanying drawings which illustrate a specific embodiment of the invention.

Referring to the drawings, the work object to be cleaned is placed in tray 153 which is seated in work carrier 148, suspended from cross rods 147 of the double chain conveyor 120, at the loading position in housing aperture 31 under the sprocket wheel 121. Conveyor 120 carries the work object through the degreasing and cleaning cycle. The work object is transported by conveyor 120 from wheel 121 upwardly to sprocket wheel 122, horizontally to wheels 123 and 124, and then downwardly through the vapor to sprocket wheel 125. From wheel 125, the work object is carried horizontally to wheel 126, passing beneath the spray nozzles 98 of well 34. Then conveyor 120 takes the work object upwardly to wheel 127, horizontally to wheel 128, downwardly to wheel 129, and horizontally through the ultrasonic bath of well 35 to sprocket wheel 130. Then the work object proceeds upwardly to be sprayed by solvent from the nozzles 60 and to pass through the vapor to the heated zone in the upper part of the housing 30 above the vapor zone. The work object then travels horizontally across the upper art of housing 30 to pass wheels 131—137, then downwardly to the unload position under wheel 121 where the now thoroughly cleaned and dry work object is removed and replaced by a work object to be cleaned.

The conveyor 120 is operated either continuously or intermittently. When operated continuously, the conveyor 120 moves at such a rate of speed that the work object remains in each stage of the process for definite time intervals. When operated intermittently, the conveyor 120 stops at each stage of the process for definite time intervals.

The following specific examples serve to illustrate the process of the invention:

*Example 1*

The work object to be cleaned is passed through the vapors arising from well 33 which contains trichlorethylene at boiling temperature. Next, the work object is sprayed in well 34 by liquid trichlorethylene at a temperature in the range of 160 to 187° F. Then the work object is again contacted by the vapors of trichlorethylene, after which it is immsersed for a period of about 3 to 20 seconds in the cooling ultrasonic bath of trichlorethylene at a temperature in the range of 110 to 140° F. in well 35. Here the work object passes under the transducers 160 and is impinged by the ultrasonic waves given off by the transducers, the vibrations being in the range of 10 kilocycles to one megacycle. Then the work object is sprayed by trichlorethylene from the nozzles 60, and is passed through trichlorethylene vapor to a heated zone where thorough drying is accomplished.

*Example 2*

The process as described in Example 1 in which the solvent is methylene chloride instead of trichlorethylene, the temperature of the ultrasonic bath liquid is in the range of about 58 to 78° F., and the temperature of the spray of well 34 is in the range of about 80 to 100° F.

*Example 3*

The process as described in Example 1 wherein the solvent is perchlorethylene instead of trichlorethylene, the temperature of the ultrasonic bath liquid is in the range of about 140 to 170° F., and the temperature of the spray of well 34 is in the range of about 180 to 245° F.

While the specific embodiment of the invention described herein has been confined to the cleaning or degreasing of a work object by contact with a chlorinated hydrocarbon solvent, it will be appreciated that the invention can be used to accomplish a variety of objects and is not limited to cleaning or degreasing.

It is to be understood that the form of the invention herein shown and described is to be taken as a preferred embodiment. Various changes may be made in the shape, size and arrangement of parts. Equivalent elements may be substituted for those described herein, parts may be reversed, and certain features of the invention may be utilized independently of the use of other features, all without departing from the spirit of the invention or the scope of the subjoined claims. While the conveyor selected for illustration is of the double chain type, it will be appreciated that a conveyor of the single chain, or of the monorail type could be used as well. The apparatus could even be hand operated if that were desirable. Further, while in the specific embodiment shown in the drawings, loading and unloading are performed at one end of the housing 30, it would be no departure from the invention to provide a loading station at one end and an unloading station at the opposite end of housing 30. Similarly, although the transducers are shown herein as being connected electrically in parallel, they may be connected in series or arranged in a combination series-parallel circuit.

Having thus described my invention, I claim:

1. A method of treating a work object comprising transporting said work object to a spray zone, spraying the work object in said spray zone with a chlorinated hydrocarbon liquid, removing said work object from the spray zone, providing piezoelectrical means to generate ultrasonic vibrations in a bath of a dielectric chlorinated hydrocarbon liquid at a second zone within said liquid out of direct mechanical contact with said means, and immersing the work object in said bath of dielectric chlorinated hydrocarbon liquid at said second zone and subjecting said object to said ultrasonic vibrations.

2. The method of treating a work object defined in claim 1, wherein said bath is perchlorethylene.

3. The method of treating a work object defined in claim 1, wherein said bath is methylene chloride.

4. A method of treating a work object comprising transporting said work object to a spray zone, spraying the work object in said spray zone with a chlorinated hydrocarbon liquid, removing said work object from the spray zone, contacting the work object in a vapor zone with the vapors of a chlorinated hydrocarbon solvent, removing the work object from the vapor zone, providing piezoelectrical means to generate ultrasonic vibrations in a bath of a dielectric chlorinated hydrocarbon liquid at a second zone within said liquid out of direct mechanical contact with said means, immersing said work object in said bath of dielectric chlorinated hydrocarbon liquid at said second zone and subjecting said bath and said object to said ultrasonic vibrations.

5. A method of treating a work object comprising supporting a work object in a carrier, contacting the work object with vapors of a chlorinated hydrocarbon solvent, then spraying said work object with a chlorinated hydrocarbon solvent, then contacting the work object with vapors of a chlorinated hydrocarbon solvent, electrically energizing piezoelectric means submerged in a bath of a dielectric chlorinated hydrocarbon solvent to generate ultrasonic vibrations therein, said piezoelectric means being at a zone within said bath out of direct mechanical contact with said work object, then immersing said work object in said bath of dielectric chlorinated hydrocarbon solvent and subjecting said work object to said ultrasonic vibrations while immersed in said solvent.

6. The method of treating a work object defined in claim 5, including also the step of contacting said work object with vapors of a chlorinated hydrocarbon solvent after removal of the work object from said bath.

7. A device for piezoelectrically generating ultrasonic vibrations in a cleaning fluid, said device comprising a piezoelectric transducer submerged in a cleaning liquid, a transducer mounting including a stationary base, a pair of blocks extending downwardly from said base, a shoulder extending inwardly from each of said blocks whereon to support said transducer and permit vibration of said transducer, a pair of stop strips connecting the ends of said blocks to prevent longitudinal movement of the transducer, said blocks, shoulders and stop strips being made of an electrically insulating material, and means for electrically energizing said transducer and for allowing substantially unrestrained vibration of said transducer in a thickness mode, said means including a pair of flexible straps in contact with one side of said transducer, the ends of said flexible straps being connected to electrical connectors which are mounted on said blocks.

8. Ultrasonic bath apparatus for cleaning particles from a work object comprising a well, said well being adapted to contain a chlorinated hydrocarbon liquid, an elongated piezoelectric transducer of arcuate cross-section, mounting means supporting said transducer in said well and submerged in said liquid convex side upward and with a clearance space for inserting said work object beneath said transducer means including said transducer piezoelectrically generating ultrasonic vibrations at a zone within said liquid out of direct mechanical contact with said work object, and flushing means directed toward said convex side whereby to provide for flushing particles cleaned from said work object away from said convex side for preventing electrical short circuits.

9. In apparatus for cleaning a work object, a housing; a first well within the housing containing a nozzle for spraying a chlorinated hydrocarbon solvent; a second well within the housing adapted to contain a chlorinated hydrocarbon solvent; a conveyor for carrying the work object from the exterior successively through the separate wells; and piezoelectric means submerged directly in the solvent of the second well and electrically energized independently of the solvent, said piezoelectric means being out of direct mechanical contact with said work object, for generating ultrasonic vibrations and subjecting the work object to said ultrasonic vibrations during the period of submergence of the work object in the solvent of the second well.

10. In apparatus for cleaning a work object, a housing; three wells serially arranged within the housing; said first well being adapted to contain a chlorinated hydrocarbon solvent; said second well containing a nozzle for spraying a chlorinated hydrocarbon solvent; said third well being adapted to contain a dielectric chlorinated hydrocarbon solvent; heating means in said first well for evaporating the solvent therein; a conveyor for carrying the work object from the exterior through each of said wells; and piezoelectric means submerged directly in the solvent of the third well and electrically energized independently of the solvent, said piezo electric means being positioned at a zone within the solvent of the third well out of direct mechanical contact with said work object, for generating ultrasonic vibrations and subjecting the solvent and the work object in the third well to said ultrasonic vibrations during the period of submergence of the work object therein.

11. In degreasing apparatus, a housing; three wells serially arranged within the housing, said first and third wells being adapted to contain a dielectric liquid solvent such as trichlorethylene; said second well containing a nozzle for spraying a solvent such a trichlorethylene; heating means in the first well for evaporating the solvent therein; an operated conveyor for carrying work to be cleaned from the exterior through each of said wells; and means for subjecting the solvent in the third well to ultrasonic vibrations during the period of submergence of the work therein, the last said means including an elongate transversely concaved transducer element having piezoelectric properties supported convex surface upward within the well immediately above the level of submergence of the work in the well; and means for producing oscillating electric current at ultrasonic frequency for passage through the transducer element.

12. Degreasing and cleaning apparatus comprising in combination, a well adapted to contain a liquid such as chlorinated hydrocarbon solvent; facilities for imparting ultrasonic vibrations to the solvent including a transducer of elongate configuration and arcuate in cross-section fashioned from ceramic material having piezoelectric properties; means for supporting the transducer horizontally with its convex side uppermost freely suspended in the liquid, and an electrically-powered ultrasonic oscillator unit with flexible leads connected to opposite ends of the transducer; and means for supporting an article to be cleaned in the liquid from above directly below the transducer so as to be subjected to the action of the liquid in the region of maximum vibratory movement.

13. A support for a transducer under which is passed a work carrier comprising a stationary base located directly above said transducer, a pair of spaced blocks fixed to and depending from said base, transducer support means adjacent the bottom of each of said blocks, the respective transducer support means extending toward one another intermediate said blocks, said transducer being mounted free on said support means, and guard means mounted on said blocks extending intermediate said transducer and said work carrier preventing accidental striking of said transducer by the work carrier.

14. Ultrasonic cleaning apparatus comprising a well, said well being adapted to contain a chlorinated hydrocarbon liquid, a transducer, mounting means supporting said transducer in the well, withdrawing means extending into the well for continuously withdrawing a portion of said liquid from said well, returning means connected to said withdrawing means extending into the well adjacent the top of said transducer to return said liquid to flush the upper surface of said transducer whereby to prevent particles of matter from accumulating on said surface, said combined withdrawing and returning means including a filter for filtering said liquid.

15. In a method of cleaning an object in a well containing cleaning liquid, said well including a transducer below the liquid surface, and of flushing the upper surface of said transducer, the steps comprising withdrawing liquid from the well, filtering said liquid externally of said well, returning said liquid to said well above said transducer, directing said filtered liquid downwardly toward and against the upper surface of the transducer whereby to prevent particles of matter from accumulating thereon.

16. The method of treating a work object defined in claim 1, wherein said bath is trichlorethylene.

References Cited in the file of this patent

UNITED STATES PATENTS

| | | |
|---|---|---|
| 2,118,480 | Somes | May 24, 1938 |
| 2,201,729 | Hood | May 21, 1940 |
| 2,484,014 | Peterson | Oct. 11, 1949 |
| 2,503,831 | Mason | Apr. 11, 1950 |
| 2,523,701 | Kuehl | Sept. 26, 1950 |
| 2,554,701 | Hackett | May 29, 1951 |
| 2,565,159 | Williams | Aug. 21, 1951 |
| 2,616,820 | Borgeaux | Nov. 4, 1952 |
| 2,645,727 | Willard | July 14, 1953 |
| 2,689,198 | Judd | Sept. 14, 1954 |

FOREIGN PATENTS

| | | |
|---|---|---|
| 654,673 | Germany | Dec. 24, 1937 |

UNITED STATES PATENT OFFICE

CERTIFICATE OF CORRECTION

Patent No. 2,852,417                                       September 16, 1958

Thomas J. Kearney

It is hereby certified that error appears in the above numbered patent requiring correction and that the said Letters Patent should read as corrected below.

In the grant, lines 2 and 3, for "assignor to Detrex Corporation, of Detroit, Michigan, a corporation of Michigan," read -- assignor to Detrex Chemical Industries, Inc., a corporation of Michigan, --; line 12, for "Detrex Corporation, its successors" read -- Detrex Chemical Industries, Inc., its successors --; in the heading to the printed specification, lines 3 and 4, for "assignor to Detrex Corporation, Detroit, Mich., a corporation of Michigan" read -- assignor to Detrex Chemical Industries, Inc., a corporation of Michigan --.

Signed and sealed this 24th day of February 1959.

(SEAL)
Attest:

KARL H. AXLINE
Attesting Officer

ROBERT C. WATSON
Commissioner of Patents